Figure 1:
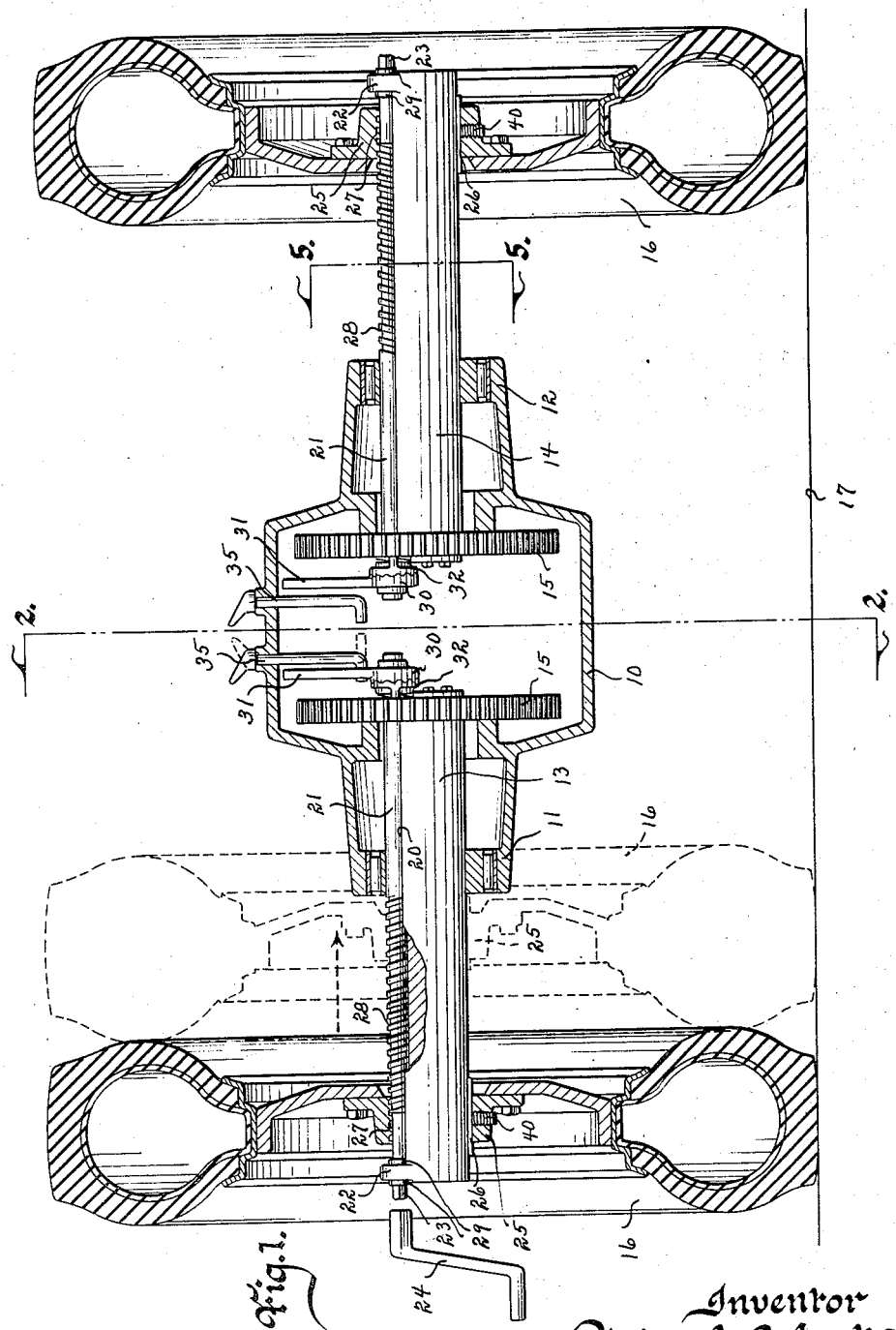

May 5, 1959 R. S. JACKSON 2,885,018
MEANS FOR LATERALLY EXPANDING AND CONTRACTING
THE TREAD OF VEHICLE WHEELS
Filed Feb. 27, 1956 2 Sheets-Sheet 1

Inventor
Richard S. Jackson
by M. Talbert Dick
Attorney

Witness
Edward P. Seeley

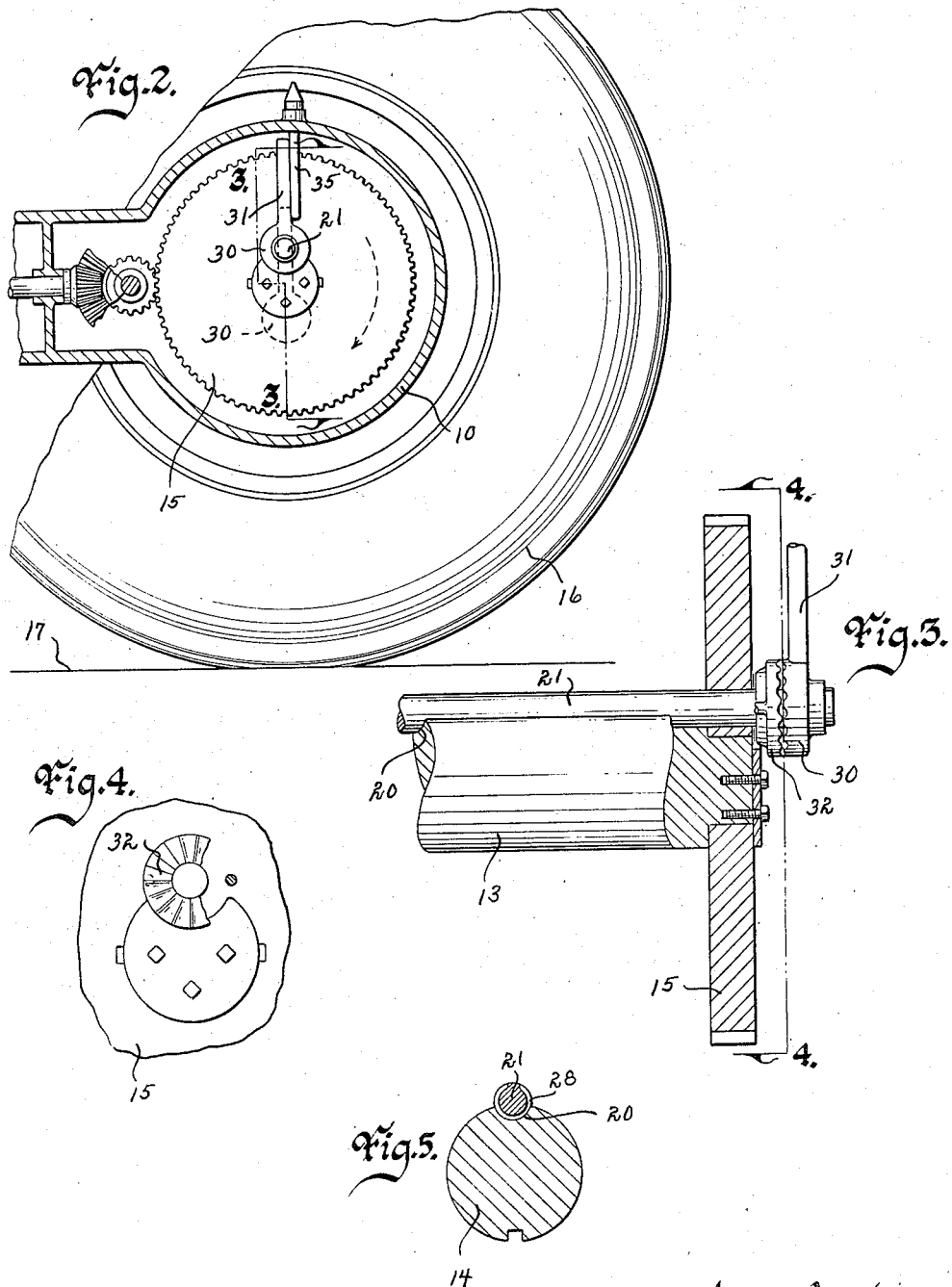

United States Patent Office 2,885,018
Patented May 5, 1959

2,885,018

MEANS FOR LATERALLY EXPANDING AND CONTRACTING THE TREAD OF VEHICLE WHEELS

Richard S. Jackson, Weldon, Iowa

Application February 27, 1956, Serial No. 567,799

2 Claims. (Cl. 180—75)

This invention relates to vehicles such as tractors or like and more particularly to a means for causing the lateral inward or outward movement of the wheel relative to the vehicle chassis.

In the use of tractors it is often necessary and desirable to move the wheels closer to or further from the tractor body. The most common method is to pick up the vehicle, unlock the wheel from the axle, and then slide the wheel in or out on its axle to the desired position, after which the wheel is again rigidly secured to the axle. This of course requires considerable time and labor. Also with the present use of giant type tires and wheels, special equipment must be employed to slide the heavy wheel on its axle. Some attempt has been made to facilitate the accomplishment of this adjustment by threading the hub of the wheel onto the axle. To effect the adjustment, the wheel is unlocked and the tractor moved rearwardly or forwardly to rotate the wheel hub on the threads of the axle. The trouble with this system, however, is that the axle, being the driving axle, readily develops looseness by wear between the threads of the wheel hub and the threads of the axle. Once even slight looseness is experienced, the wear and tear on the threads progress most rapidly. Also the threads, at least after a little wear, tend to objectionably cant the wheel with disastrous results.

Therefore, one of the principal objects of my invention is to provide a means for easily and quickly laterally expanding or contracting the supporting wheels of a vehicle.

A further object of this invention is to provide an automotive vehicle traction wheel adjusting means that is operated by the prime mover of the vehicle.

A still further object of my invention is to provide a means for laterally adjusting the wheels of a tractor or like that may be accomplished by the operator without getting off the tractor.

Still further objects of this invention are to provide a vehicle wheel adjusting device that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a transverse sectional view of a vehicle showing my means installed thereon, Fig. 2 is a longitudinal sectional view of the device taken on line 2—2 of Fig. 1, Fig. 3 is an enlarged sectional view of my means, taken on line 3—3 of Fig. 2 and more fully illustrates its construction, Fig. 4 is a sectional view of the clutch mechanism taken on line 4—4 of Fig. 3, and Fig. 5 is an enlarged cross sectional view of the axle portion taken on line 5—5 of Fig. 1.

In these drawings, I only show a portion of a vehicle such as a tractor. A part of the body of the tractor is the differential gear housing 10. At each side of the housing is an axle bearing portion designated by the numerals 11 and 12 respectively. These two bearings rotatably support the two wheel axle shafts 13 and 14, as shown in Fig. 1. Secured to each axle and inside the gear housing is a gear wheel 15. These toothed gear wheels 15 are adapted to be operatively secured to the prime mover (not shown) of the vehicle. Each shaft has a wheel 16 which engages the ground or supporting surface 17 thus supporting the vehicle. It is to such equipment that I use my device and which I will now describe in detail.

Inasmuch as both wheels 16 use that same treatment, I will describe one wheel unit, it being understood that the other wheel will be the same and have the same numerals on like parts. The numeral 20 designates a longitudinal groove in the surface of the axle shaft 13, circular in cross section. Rotatably resting partially in this groove 20, as shown in Fig. 5, is a rod shaft 21. This rod shaft 21 has its outer end portion embraced by a retaining bearing 22 on the outer end portion of the axle shaft 13. The extreme outer end 23 of the rod shaft 21 is squared to detachably take a crank wrench 24. The hub 25 of the wheel 16 closely embraces its axle shaft and is held from independent rotation relative to its shaft axle by the usual groove and key 26. In that portion of the hub that embraces the rod shaft are internal threads 27. The numeral 28 designates external threads in the rod shaft threaded in the threads 27 of the wheel hub. To prevent longitudinal movement of the rod shaft 21 relative to the axle, a collar 29 is located on the rod shaft at each side of the bearing collar 22. The inner end of the rod shaft extends through the gear wheel 15 and has a common type friction clutch head 30 secured to this end portion, as shown in Fig. 3. The numeral 31 designates an arm on the clutch head 30. Between the clutch head 30 and the gear wheel 15 is the complementary spring loaded clutch head 32 slidably secured to the wheel 15. The numeral 35 designates a rotatable lever extending into the gear housing 10 and capable of being manually turned and held into the path of the arm 31.

When the arm 31 is not being held, the threaded rod shaft will make one revolution of its orbit with the periphery of the axle shaft 13. If the threaded rod shaft is not held against axial rotation, it will make one revolution to one revolution of the axle shaft. On the other hand, if the arm 31 is held, the threaded shaft will make one revolution in its orbit but will make no axial rotation. However, when this is done, the axle shaft 13 will make one revolution. Thus, it is the axle shaft 13 that makes one independent axial rotation to no axial rotation of the threaded rod shaft, and the traction wheel is moved outwardly or inwardly.

Obviously, when the rod shaft 21 is rotated in one direction the wheel 16 will be slid outwardly on the axle shaft 13 and when it is rotated in the opposite direction the wheel will be slid inwardly on the axle shaft 13. Any suitable means may be used to rotate the rod shaft relative to the wheels with which it is associated and in the drawings I show two methods. The manual means is by the use of the crank wrench 24. The power means is by the use of the control lever 35. Of course any suitable power means may be used such as an electric means, a hydraulic means, or the power takeoff of the engine of the tractor in place of the hand crank 24. I show the indirect power of the tractor engine used to rotate the wheels 16 and this propels the vehicle over the ground surface. With the tractor in gear and running forwardly, the arms 31 will rotate with the axle shafts and their gears 15. However, if either arm is held by blocking its rotation (such as by turning a control lever 35 into its path) the rod shaft 21 will be held against rotation as it travels around with the axle and therefore every complete rotation of the axle and wheel will equal one complete relative axial rotation of the rod shaft relative to the wheel, thus moving or sliding the wheel accordingly on its axle shaft. By the same procedure, if the tractor is placed in to the rear motion, the wheel will be slid in the opposite direction. By making a complete unit for each wheel, each wheel may be independently moved outwardly or inwardly on its axle thereby spreading the wheels or bringing them closer together, or adjusting them relative to the vehicle body. All this may be accomplished by the operator by manipulating the parts 35 and without dismounting from the vehicle. A set screw 40 may be used to lock the key 26.

Some changes may be made in the construction and arrangement of my means for laterally expanding or contracting a vehicle wheel without departing from the real spirit and purpose of my invention, and it is my intention to cover by my claims, any modified forms of structure or use of mechanical equivalents which may be reasonably included within their scope.

I claim:

1. In a variable tread vehicle, a vehicle bearing, a shaft rotatably mounted in said bearing and having a longitudinal groove in its periphery, a gear wheel on said axle adapted to be connected to a prime mover, a traction wheel having a hub portion longitudinally slidably mounted on said axle shaft, a threaded rod shaft rotatably mounted in the groove of said shaft and threaded through that part of the hub of said traction wheel that is adjacent said shaft, and a means for producing axial rotation of said rod shaft relative to said shaft.

2. In a variable tread vehicle, a vehicle bearing, a shaft rotatably mounted in said bearing, a gear wheel on said axle shaft adapted to be connected to a prime mover, a traction wheel having a hub portion longitudinally slidably mounted on said axle shaft, a rod shaft rotatably mounted within the periphery of said axle shaft, said rod shaft threaded through said hub portion and extending through said gear wheel, an arm on said rod shaft, and a control lever capable of being placed in the path of said arm and capable of preventing the axial rotation of said rod shaft as it moves in its orbit with said shaft.

References Cited in the file of this patent

UNITED STATES PATENTS

| | | |
|---|---|---|
| 114,979 | Sewell | May 19, 1871 |
| 2,417,139 | Strehlow | Mar. 11, 1947 |

FOREIGN PATENTS

| | | |
|---|---|---|
| 382,888 | Germany | May 18, 1921 |